United States Patent [19]

Djian

[11] Patent Number: 6,058,371
[45] Date of Patent: May 2, 2000

[54] METHOD OF ADMINISTERING A FINANCIAL INSTRUMENT HAVING A SERVICE VOUCHER-BASED RETURN COMPONENT

[76] Inventor: Jacques-Henri Djian, 67 Rue de Courcelles, 75008, Paris, France

[21] Appl. No.: 09/075,113

[22] Filed: May 8, 1998

[51] Int. Cl.[7] .................................................. G06F 17/00
[52] U.S. Cl. ................................................ 705/14; 705/1
[58] Field of Search ..................................... 705/14, 1, 27

[56] References Cited

U.S. PATENT DOCUMENTS

| | | | |
|---|---|---|---|
| 4,885,685 | 12/1989 | Wolfberg et al. | 705/14 |
| 5,200,889 | 4/1993 | Mori | 364/401 |
| 5,233,514 | 8/1993 | Ayyoubi et al. | 364/408 |
| 5,297,026 | 3/1994 | Hoffman | 705/14 |
| 5,513,102 | 4/1996 | Auriemma | 705/14 |
| 5,576,951 | 11/1996 | Lockwood | 705/27 |
| 5,592,376 | 1/1997 | Hodroff | 705/14 |
| 5,592,379 | 1/1997 | Finfrock et al. | 395/239 |
| 5,642,419 | 6/1997 | Rosen | 380/23 |
| 5,708,782 | 1/1998 | Larson et al. | 395/214 |
| 5,734,838 | 3/1998 | Robinson et al. | 705/14 |
| 5,794,207 | 8/1998 | Walker et al. | 705/1 |
| 5,864,822 | 1/1999 | Baker, III | 705/14 |
| 5,870,724 | 2/1999 | Lawlor et al. | 705/42 |

OTHER PUBLICATIONS

"Machine Organization, An Introduction to the Structure and Programming of Computing Systems," Charles P. Pfleeger, Wiley & Sons, 1982, pp. 3–11.

*Primary Examiner*—Allen R. MacDonald
*Assistant Examiner*—Forest Thompson, Jr.
*Attorney, Agent, or Firm*—Needle & Rosenberg, P.C.

[57] ABSTRACT

In a method of administering a capital funding system, a first predetermined monetary sum, representing a principle amount of a bond, is accepted as a loan from a subscribing entity. A second predetermined monetary sum, representing a first portion of an interest payment for the first predetermined monetary sum, is periodically transferred to the subscribing entity, the second monetary sum. At least one service voucher is periodically transferred to the subscribing entity, the service voucher having a value representing a second portion of an interest payment for the first predetermined monetary sum and entitling a bearer to a predetermined quantity of a selected service.

27 Claims, 4 Drawing Sheets

6,058,371

METHOD OF ADMINISTERING A FINANCIAL INSTRUMENT HAVING A SERVICE VOUCHER-BASED RETURN COMPONENT

BACKGROUND OF THE INVENTION

1. Field of the Invention

The present invention relates to administrative methods and, more specifically, to a method of administering a financial instrument.

2. Description of the Prior Art

Many organizations issue bonds to finance the purchase of capital equipment. Such bonds typically comprise a principle amount and an obligation to pay to the bond holder interest on the bond at regular intervals until the bond matures, at which time the issuing entity is obligated to pay the bond holder the principle amount.

For example, an airline typically issues a series of bonds to facilitate the purchase of new airplanes. The principle amount roughly equals the purchase cost of the new airplanes. The bond might have a 30 year maturity, during which period the airline must periodically pay interest. At the end of the 30 years, the airline must pay the principal amount to the bond holder.

Many bond issuing entities are service providers that have relatively fixed costs, irrespective of the actual number of customers using the services. In the airline example, many flights will have as many as 30% seats going unused. To achieve economic benefit from these unused services, the service providers frequently offer them as part of an incentive program. Again, using the airline example, most airlines issue "frequent flyer" miles that allow regular passengers to purchase tickets, usually for otherwise unused seats, once the passenger has accumulated a predetermined number of miles.

Frequent flyer miles have considerable value to the passengers and cost the airlines virtually nothing. Yet they have the disadvantage to the airlines that they only provide the incidental benefit to the airline of encouraging passengers to fly on one airline versus another. They do not provide direct income to the airline. Furthermore, they have the disadvantage to the passengers of requiring the passengers to earn miles over a long period of time and sometimes in an unpredictable fashion.

SUMMARY OF THE INVENTION

The disadvantages of the prior art are overcome by the present invention which, in one aspect, is a method of administering a capital funding system. A first predetermined monetary sum, representing a principle amount of a bond, is accepted as a loan from a subscribing entity. A second predetermined monetary sum, representing a first portion of an interest payment for the first predetermined monetary sum, is periodically transferred to the subscribing entity. At least one service voucher is periodically transferred to the subscribing entity. The service voucher has a value representing a second portion of an interest payment for the first predetermined monetary sum and entitles a bearer to a predetermined quantity of a selected service.

Another aspect of the invention is a computer system for administering a financial instrument, which includes a computer and a computer-readable memory. The memory is encoded with a program for causing the computer to execute the following steps: (1) assign a voucher-to-interest ratio to a first memory location, the voucher-to-interest ratio representing a value of service vouchers paid to a subscriber as a function of a value of cash due to the subscriber when payment is made to the subscriber in service vouchers instead of cash; (2) assign a value corresponding to a principle amount of a bond that was paid to an issuing entity by a subscribing entity to a second memory location; (3) assign an interest rate to a third memory location. (4) calculate an interest amount to be paid at the end of a predetermined period as interest on the bond, wherein the interest amount equals the valued stored in the second memory location times the value stored in the third memory location, and assign the interest amount to a fourth memory location; (5) determine a value for a service voucher, the service voucher being one service voucher of a plurality of equally-valued service vouchers, the service voucher entitling a bearer to a predetermined quantity of a selected service, and assign the value of the service voucher to a fifth memory location; (6) calculate a total value of service vouchers to be paid to the subscribing entity, wherein the total value of service vouchers equals the value stored in the first memory location times the value stored in fourth memory location, and assign the total value of service vouchers to a sixth memory location; (7) calculate a number of service vouchers to be transferred to the subscribing entity, wherein the number equals the value stored in the sixth memory location divided by the value stored in the fifth memory location, and assign the number to a seventh memory location; and (8) transfer the number of service vouchers, the value of which is stored in seventh memory location to the subscribing entity.

Another aspect of the invention is a method of exchanging service vouchers between several subscribing entities. A service voucher of a first type is received from a first subscribing entity. An account assigned to the first subscribing entity is credited with a value indicator corresponding to the service voucher of the first type. A service voucher of a second type is received from a second subscribing entity. An account assigned to the second subscribing entity is credited with a value indicator corresponding to the service voucher of the second type. A request from the second subscribing entity for a service voucher of the first type is received. A service voucher of the first type is transferred to the second subscribing entity a value indicator corresponding to the service voucher of the first type is deducted from the account of the second subscribing entity if the account of the second subscribing entity includes a value indicator at least equal to the value indicator corresponding to the service voucher of the first type.

Yet another aspect of the invention is a method of providing services in which an issuing entity uses actuarial methods to estimate a quantity of units of a selected service that will be unused during a predetermined future period and assigns a value to each unit of the selected service. The issuing entity generates a service voucher for each unit of the selected service, wherein the service voucher entitles a holder to a unit of the selected service and transfers a plurality of the service vouchers to a subscribing entity as payment for at least a portion of interest on a bond.

Yet another aspect of the invention is a financial instrument that includes a principle obligation, obligating an issuing entity to pay a principle amount to a subscribing entity by a predetermined date; an interest obligation, obligating the issuing entity to pay periodically to the subscribing entity a payment of an interest portion having a predetermined value; and a service voucher obligation, obligating the issuing entity to transfer periodically to the subscribing entity at least one service voucher having a predetermined value. Each service voucher entitles a bearer to a predetermined quantity of a selected service. The value of a periodic payment of the service voucher obligation plus the value of a periodic payment of the interest obligation corresponds to an interest payment on the principle amount.

In all of the above-described embodiments the services could include any type of service provided in which a portion of overhead costs are relatively independent of actual usage of the service. Several examples include airline usage (as represented by airline frequent flier miles), accommodation periods at a hotel, train and bus usage, car rental units, telephone usage units, or any other service. Preferably, the service is of the type in which transfer of unused capacity does not result in an additional cost proportional to the amount of unused capacity transferred.

These and other aspects of the invention will become apparent from the following description of the preferred embodiments taken in conjunction with the following drawings. As would be obvious to one skilled in the art, many variations and modifications of the invention may be effected without departing from the spirit and scope of the novel concepts of the disclosure.

DETAILED DESCRIPTION OF THE INVENTION

Figure 1:
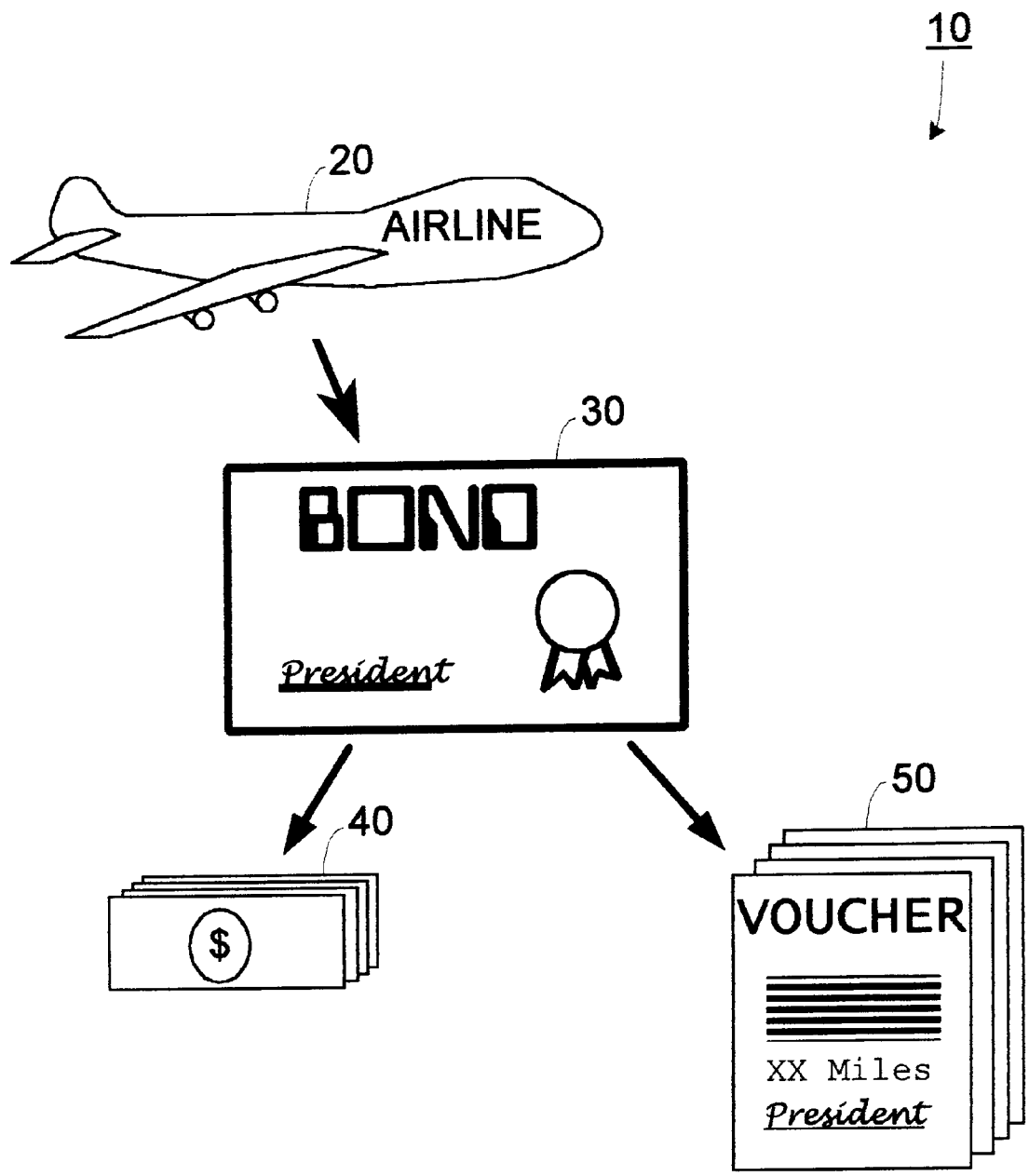
FIG. 1 is a schematic diagram of one embodiment of the invention.

A preferred embodiment of the invention is now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on."

As shown in FIG. 1, one embodiment of the invention is method of administering a capital funding program 10. When an issuing entity 20, for example a airline, needs to purchase capital equipment, for example a new fleet of aircraft, it issues a bond 30 to one or more subscribing entities, for example investors. The bond 30 is issued in exchange for a principal amount and creates an obligation for the issuing entity 20 to pay the holder of the bond the principal amount on a predetermined maturity date.

As with conventional bonds, the issuing entity 20 is obligated to pay interest periodically to the subscribing entity. However, unlike conventional bonds, the issuing entity 20 of the invention transfers service vouchers 50 to the subscribing entity to satisfy at least part of the interest obligation. In the airline example, the service vouchers 50 could be for "frequent flyer miles" allowing the holder to purchase tickets in exchange for the vouchers. In this example, the vouchers could even be structured to guarantee the subscribing entity seats on certain flights (for example, on flights that the airline predicts, based on common actuarial methods, will have a predictable low usage rate).

The issuing entity 20 may also be required to make a partial interest payment in cash 40. The issuing entity 20 could give the subscribing entity the option of selecting a partial cash 40 interest payment along with the service voucher 50 interest payment, or a service voucher 50 only interest payment.

As an incentive to the subscribing entity to purchase bonds 30 of this sort, the issuing entity could determine the fair market value of the service vouchers 50 and transfer enough service vouchers 50 to the receiving entity so that the value received by the receiving entity exceeds the current market interest rate on similar capital procurement bonds. For example, if the market interest rate at the time the bond 30 is issued is 8%, the issuing entity 20 could make interest payments in the form of 4% of the principle in cash 40 plus 6% of the principle in service vouchers 50. In that way the issuing entity would effectively save 4% of its interest payments, because the service vouchers 50, being for otherwise-unused services, cost the issuing entity 20 very little. The subscribing entity, on the other hand, would realize an effective 10% interest rate return on its investment. This figure could be increased if the subscribing entity elects to have the entire interest payment paid in service vouchers 50. In this case, the subscribing entity would receive service vouchers 50 having a market value, in the current example, equal to 12% of the principal, which is 4% more than it would have received in purchasing a conventional bond.

An illustrative (although not complete) list of services that could be provided includes: "miles" provided by an airline; "accommodation periods" provided by hotel chains; "rental periods" provided by car rental companies; "telephone minutes" provided by telephone companies; and "railway miles" provided by railway companies. As is readily apparent, many other services could be provided without departing from the scope of the invention.

To further enhance the desirability of the invention, the service vouchers 50 could be either exchangeable or assignable, or both. If exchangeable, a subscriber could exchange vouchers issued by a first issuing entity, such as an airline having one route, for vouchers issued by a second issuing entity, such as an airline having a different route. The subscribing entity could also exchange its service vouchers 50 for vouchers for other types of services, such as for accommodation units at a hotel, or telephone usage, or car-rental days. If assignable, the subscribing entity could sell the vouchers at current market prices, which could fluctuate for the vouchers.

In one embodiment, the subscribing entity may elect to be paid the face value of the bond 30, or a portion thereof, in service vouchers 50 instead of cash 40 at the maturity date. Such an arrangement could benefit both the issuing entity 20 and the subscribing entity in the manner disclosed above.

Figure 2:
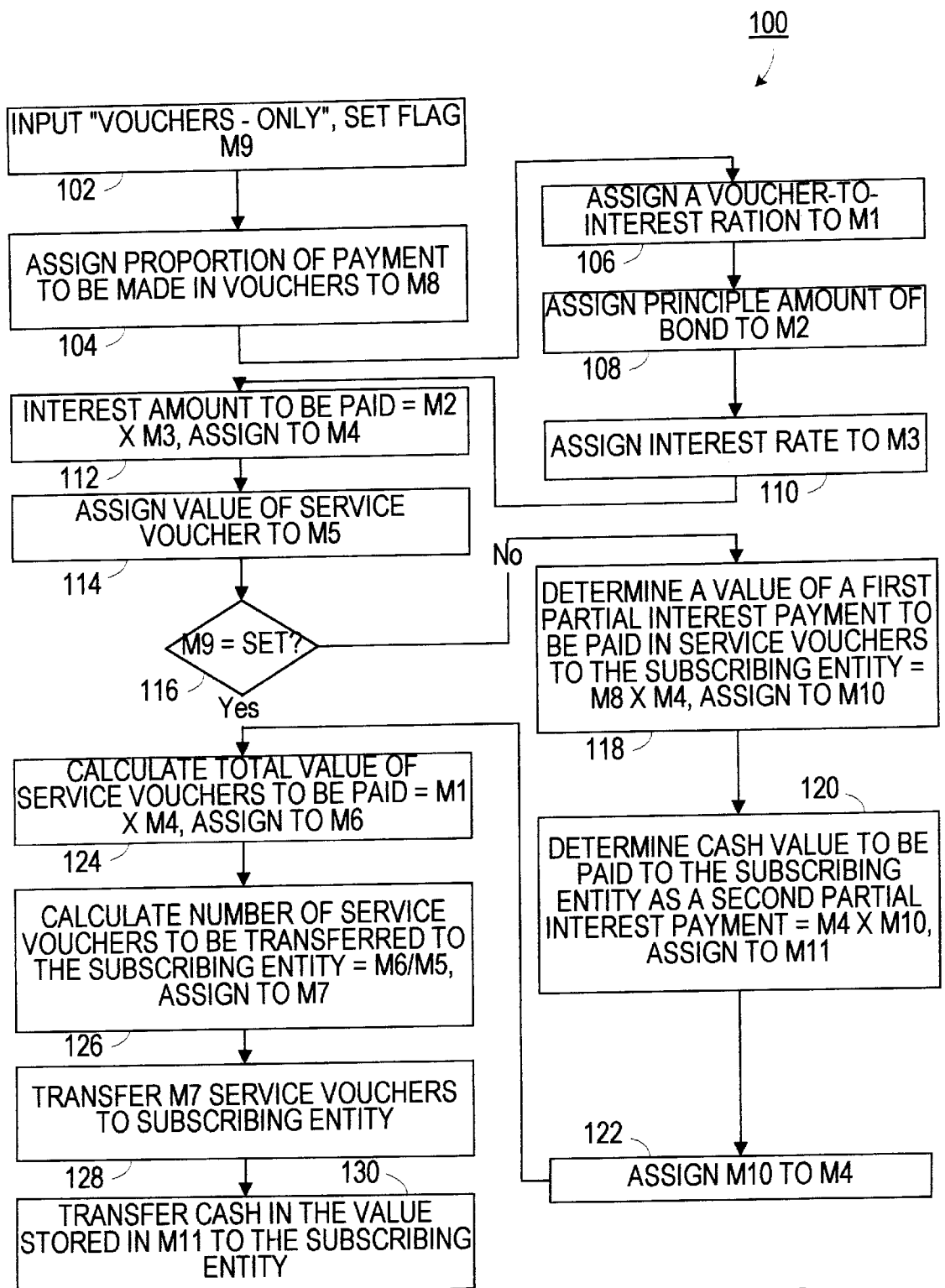
FIG. 2 is a flow chart showing one embodiment of a program for implementing the invention on a computer.

It is expected that execution of the present invention would require a computerized system. As shown in FIG. 2, such a system would include a computer having a computer-readable memory encoded with a program for causing the computer to execute the following steps: assign a flag to a memory location designated as M9 102, wherein the flag, if set, indicates that the subscribing entity is to receive only service vouchers as interest payments, and assign to a memory location designated a M8 a fraction 104 indicating a percentage of an interest payment to be paid in service vouchers. For example if 50% of each interest payment was to be paid in service vouchers (with the other 50% being paid in cash), 0.5 would be assigned to M8.

The computer then assigns a voucher-to-interest ratio to a memory location designated as M1 106, the voucher-to-interest ratio represents the value of service vouchers paid to a subscriber as a function of cash value due to the subscriber when payment is made to the subscriber in service vouchers instead of cash. For example as an incentive to encourage the subscribing entity to elect vouchers, the issuing entity could give the subscribing entity service vouchers valued at 120% of the value of corresponding cash payments. In such a case, the value 1.2 would be assigned to memory location M1.

Next, the computer assigns a value corresponding to a principle amount of a bond that was paid to the issuing entity by the subscribing entity to a memory location designated as M2 108 and assigns an interest rate to a memory location designated as M3 110. Next, the computer calculates an interest amount 112 to be paid at the end of a predetermined period as interest on the bond, wherein the interest amount equals the valued stored in M2 times the value stored in M3, and assign the interest amount to a memory location designated as M4.

The issuing entity determines the value for the service vouchers, which it enters into the computer. The computer then assigns the value of the service voucher to a memory location designated as M5 114. The determination of the value for the service vouchers could be made through one of several methods, including performing a market analysis to determine the fair market value of the voucher.

Next, the computer performs a test 116 to determine if the flag stored in memory location M9 has been set. If the flag stored in memory location M9 has not been set, indicating that the subscribing entity is to receive both cash and service vouchers, the computer executes the following steps:

The computer determines the value of a first partial interest payment to be paid in service vouchers to the subscribing entity 118. The value of the first partial interest payment equals the value stored in M8 times the value stored in M4. The computer assigns the value of the first partial interest payment to a memory location designated as M10.

The cash value to be paid to the subscribing entity as a second partial interest payment is determined 120. The cash value of the second partial interest payment equals the value stored in M4 times the value stored in M10. The value off the second partial interest payment is assigned to a memory location designated as M11.

The computer then assigns the value stored in M10 to M4 122. The computer then returns to the thread of execution it left off at test 116.

If test 116 indicates that the "vouchers-only" flag has been set, or if the flag has not been set and the assignment of item 122 has completed, then the computer calculates a total value of service vouchers to be paid to the subscribing entity 124. The total value of service vouchers equals the value stored in M1 times the value stored in M4. The total value of service vouchers is then assigned to a memory location designated as M6.

Next, the computer calculates a number of service vouchers to be transferred to the subscribing entity 126. The number equals the value stored in M6 divided by the value stored in M5. The computer assigns this number to a memory location designated as M7.

Next, the computer issues a command to transfer the number of service vouchers, the value of which is stored in M7 128, and to transfer any cash in the value stored in M11 130, to the subscribing entity.

As will be readily appreciated, the nomenclature of the memory locations presented in the above-disclosed embodiment does not limit the scope of the invention. Many other systems of designating the memory locations, including the use of descriptive variable names, may be employed without departing from the scope of the invention.

Figure 3:
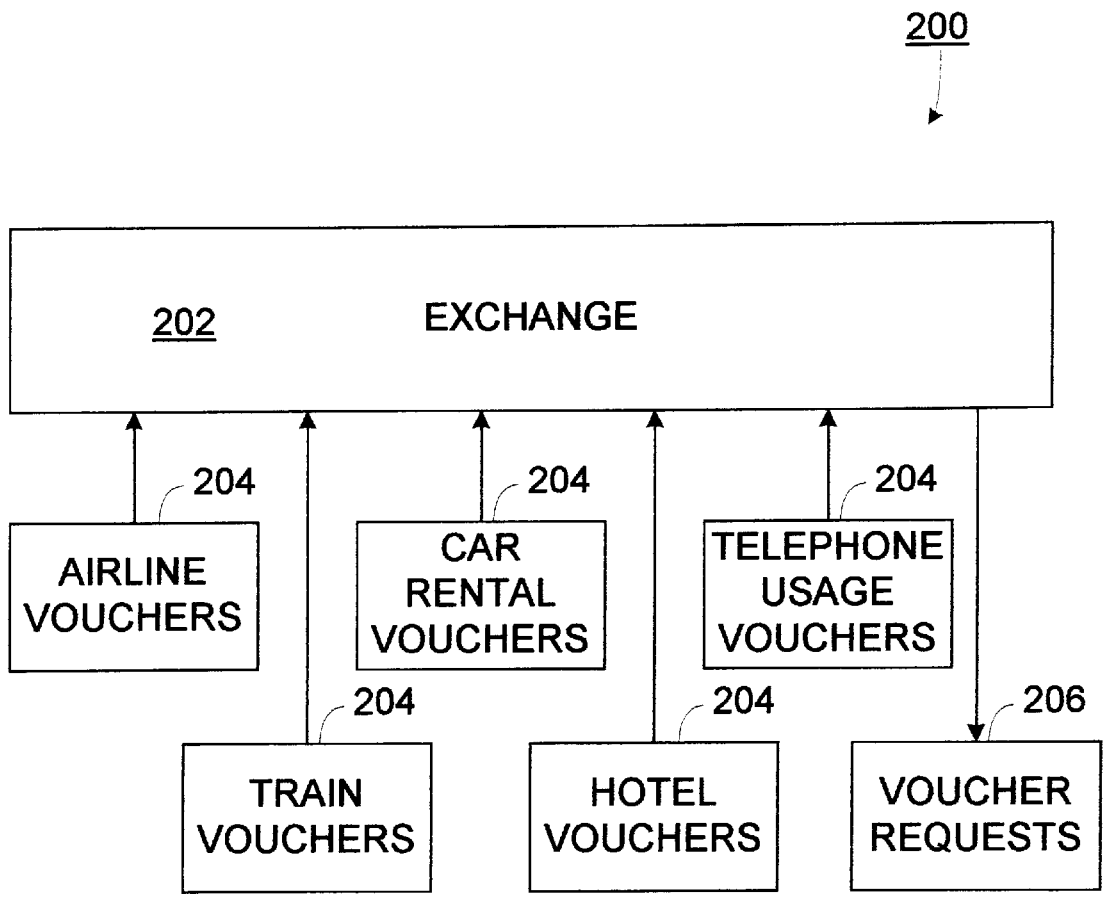
FIG. 3 is a schematic diagram of a system for exchanging service vouchers.

As stated above, the subscribing entity may exchange its vouchers for vouchers of another type. Accordingly, as shown in FIG. 3, the invention also includes a system 200 for facilitating the exchange of service vouchers. The system includes an exchange authority 202, which acts as a broker for vouchers 204. The subscribing entities deliver their vouchers 204, which include vouchers 204 from many different issuing entities and each entity is given an account at the exchange 202 that records the number and type of vouchers 204 received from each respective entity. When a subscribing entity desires a voucher 204 of a given type, it submits a voucher request to the exchange and the exchange fulfills the request 206 if it has the desired vouchers and the subscribing entity's account reflects sufficient value.

Figure 4:
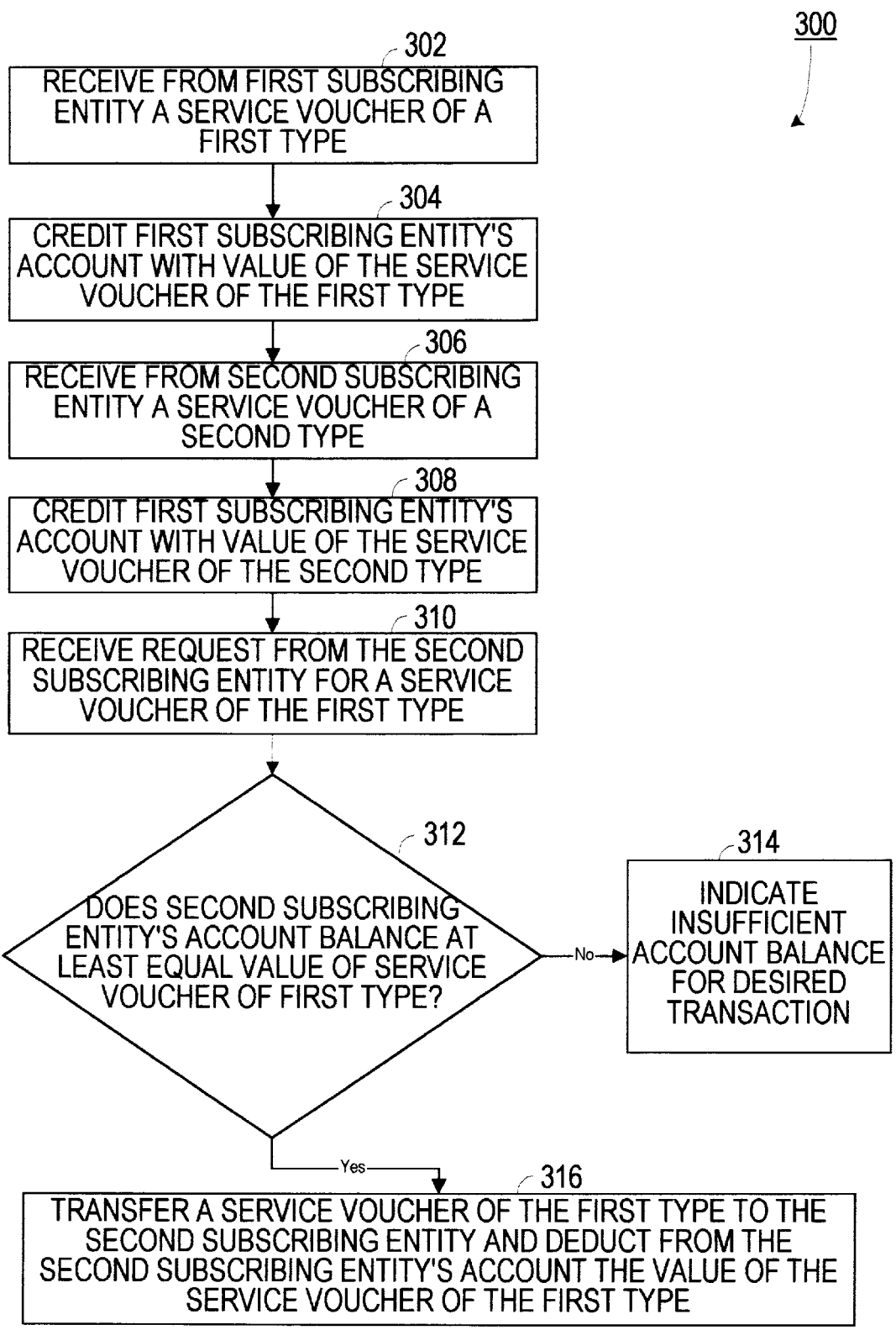
FIG. 4 is a flow chart of one illustrative method of exchanging vouchers in accordance with the embodiment disclosed in FIG. 3.

As shown in FIG. 4, the method 300 of exchanging service vouchers between several subscribing entities, includes several steps. The exchange receives from a first subscribing entity a service voucher of a first type 302 and then credits the account assigned to the first subscribing entity with a value indicator corresponding to the service voucher of the first type 304. The exchange also receives from a second subscribing entity a service voucher of a second type 306 and credits the account assigned to the second subscribing entity with a value indicator corresponding to the service voucher of the second type 308. When the second subscribing entity desires a voucher of the first type, it submits a request to the exchange. Thus, the exchange receives a request from the second subscribing entity for a service voucher of the first type 310.

Next, the exchange performs a test 312 to determine if the account of the second subscribing entity includes a value indicator at least equal to the value indicator corresponding to the requested service voucher of the first type. If it does not, the exchange indicates that there is insufficient account balance for the desired transaction and denies the request 314. If there is a sufficient account balance, then the exchange transfers a service voucher of the first type to the second subscribing entity and deducts from the account of the second subscribing entity a value indicator corresponding to the service voucher of the first type 316.

The above described embodiments are given as illustrative examples only. It will be readily appreciated that many deviations may be made from the specific embodiments disclosed in this specification without departing from the invention. Accordingly, the scope of the invention is to be determined by the claims below rather than being limited to the specifically described embodiments above.

I claim:

1. A data processing system for administering a capital funding system, comprising:

a. means for accepting a first predetermined monetary sum as a loan from a subscribing entity, the first predetermined monetary sum representing a principle amount of a bond;

b. computer processing means for periodically transferring a second predetermined monetary sum to the subscribing entity, the second monetary sum representing a first portion of an interest payment for the first predetermined monetary sum; and c. computer processing means for periodically transferring at least one service voucher to the subscribing entity, the service voucher having a value representing a second portion of an interest payment for the first predetermined monetary sum and entitling a bearer to a predetermined quantity of a selected service.

2. The method of claim 1, wherein the selected service comprises airline frequent flier miles.

3. The method of claim 1, wherein the selected service comprises accommodation periods at a hotel.

4. The method of claim 1, wherein the selected service comprises car rental units.

5. The method of claim 1, wherein the selected service comprises telephone usage units.

6. A computer system for administering a financial instrument, comprising:
   a. a computer; and
   b. a computer-readable memory encoded with a program for causing the computer to execute the following steps:
      i. assign a voucher-to-interest ratio to a memory location designated as M1, the voucher-to-interest ratio representing a value of service vouchers paid to a subscriber as a function of a value of cash due to the subscriber when payment is made to the subscriber in service vouchers instead of cash;
      ii. assign a value corresponding to a principle amount of a bond that was paid to an issuing entity by a subscribing entity to a memory location designated as M2;
      iii. assign an interest rate to a memory location designated as M3;
      iv. calculate an interest amount to be paid at the end of a predetermined period as interest on the bond, wherein the interest amount equals the valued stored in M2 times the value stored in M3, and assign the interest amount to a memory location designated as M4;
      v. determine a value for a service voucher, the service voucher being one service voucher of a plurality of equally-valued service vouchers, the service voucher entitling a bearer to a predetermined quantity of a selected service and assign the value of the service voucher to a memory location designated as M5;
      vi. calculate a total value of service vouchers to be paid to the subscribing entity, wherein the total value of service vouchers equals the value stored in M1 times the value stored in M4, and assign the total value of service vouchers to a memory location designated as M6;
      vii. calculate a number of service vouchers to be transferred to the subscribing entity, wherein the number equals the value stored in M6 divided by the value stored in M5, and assign the number to a memory location designated as M7; and
      viii. transfer the number of service vouchers, the value of which is stored in M7, to the subscribing entity.

7. The computer system of claim 6, wherein the computer-readable memory is further encoded with a program for causing the computer to further execute the following steps:
   ix. assign a flag to a memory location designated as M9, wherein the flag, if set, indicates that the subscribing entity is to receive only service vouchers as interest payments;
   x. assign to a memory location designated a M8 a fraction indicating a percentage of an interest payment to be paid in service vouchers;
   xi. determine if the flag stored in memory location M9 has been set and if the flag stored in memory location M9 has not been set, then executing the following steps prior to executing step vi. of claim 6:
      A. determine a value of a first partial interest payment to be paid in service vouchers to the subscribing entity, wherein the value of the first partial interest payment equals the value stored in M8 times the value stored in M4, and assign value of the first partial interest payment to a memory location designated as M10; and
      B. determine a cash value to be paid to the subscribing entity as a second partial interest payment, wherein the cash value of the second partial interest payment equals the value stored in M4 times the value stored in M10, and assign the value off the second partial interest payment to a memory location designated as M11; and
      C. assign the value stored in M10 to M4; and
   xii. transfer cash in the value stored in M11 to the subscribing entity.

8. The computer system of claim 6, wherein the selected service comprises airline frequent flier miles.

9. The computer system of claim 6, wherein the selected service comprises accommodation periods at a hotel.

10. The computer system of claim 6, wherein the selected service comprises car rental units.

11. The computer system of claim 6, wherein the selected service comprises telephone usage units.

12. A method of exchanging service vouchers between several subscribing entities, comprising the steps of:
   a. receiving from a first subscribing entity a service voucher of a first type issued as payment of at least part of an interest obligation;
   b. crediting in a computer database an account assigned to the first subscribing entity with a value indicator corresponding to the service voucher of the first type;
   c. receiving from a second subscribing entity a service voucher of a second type issued as payment of at least part of an interest obligation;
   d. crediting in a computer database an account assigned to the second subscribing entity with a value indicator corresponding to the service voucher of the second type;
   e. receiving a request from the second subscribing entity for a service voucher of the first type; and
   f. issuing a computer-generated instruction to transfer a service voucher of the first type to the second subscribing entity and to deduct from the account of the second subscribing entity a value indicator corresponding to the service voucher of the first type if the account of the second subscribing entity includes a value indicator at least equal to the value indicator corresponding to the service voucher of the first type.

13. An apparatus for administering a financial instrument, comprising:
   a. a computer for assigning a first value to a first memory location, the first value corresponding to a principle amount of a bond that was paid to an issuing entity by a subscribing entity;
   b. a computer for calculating an interest amount to be paid periodically as interest on the bond;
   c. a computer for calculating a value for a plurality of service vouchers, each service voucher entitling a bearer to a predetermined quantity of a selected service; and
   d. a computer for periodically transferring to the subscribing entity a number of service vouchers to the subscribing entity, the number of service vouchers having a value equal to a predetermined portion of the interest amount.

14. The apparatus of claim 13, wherein the selected service comprises airline frequent flier miles.

15. The apparatus of claim 13, wherein the selected service comprises accommodation periods at a hotel.

16. The apparatus of claim 13, wherein the selected service comprises car rental units.

17. The apparatus of claim 13, wherein the selected service comprises telephone usage units.

18. A method of providing services, comprising the steps of:
   a. employing a computer, programmed to use actuarial methods, to estimate a quantity of units of a selected service that will be unused during a predetermined future period;
   b. assigning a value to each unit of the selected service;
   c. employing a computer to generate a service voucher for each unit of the selected service, wherein the service voucher entitles a holder to a unit of the selected service; and
   d. employing a computer programmed to transfer a plurality of the service vouchers to a subscribing entity as payment for at least a portion of interest on a bond.

19. The method of claim 18, wherein the selected service comprises airline frequent flier miles.

20. The method of claim 18, wherein the selected service comprises accommodation periods at a hotel.

21. The method of claim 18, wherein the selected service comprises car rental units.

22. The method of claim 18, wherein the selected service comprises telephone usage units.

23. A process for administering a financial instrument, comprising:
   a. storing, in a computer memory, a first number corresponding to a principle obligation, the principle obligation obligating an issuing entity to pay a principle amount to a subscribing entity by a predetermined date;
   b. storing, in a computer memory a second number corresponding to an interest obligation, the interest obligation obligating the issuing entity to pay periodically to the subscribing entity a payment of an interest portion having a predetermined value;
   c. storing, in a computer memory, a third number corresponding to a service voucher obligation, the service voucher obligation obligating the issuing entity to transfer periodically to the subscribing entity at least one service voucher having a predetermined value, each service voucher entitling a bearer to a predetermined quantity of a selected service,
   whereby the value of a periodic payment of the service voucher obligation plus the value of a periodic payment of the interest obligation corresponds to an interest payment on the principle amount; and
   d. periodically generating a computer instruction to transfer to the subscribing entity the at least one service voucher and the payment of the interest portion.

24. The process for administering a financial instrument of claim 23, wherein the selected service comprises airline frequent flier miles.

25. The process for administering a financial instrument of claim 23, wherein the selected service comprises accommodation periods at a hotel.

26. The process for administering a financial instrument of claim 23, wherein the selected service comprises car rental units.

27. The process for administering a financial instrument of claim 23, wherein the selected service comprises telephone usage units.

* * * * *

UNITED STATES PATENT AND TRADEMARK OFFICE
CERTIFICATE OF CORRECTION

PATENT NO. : 6,058,371
DATED : May 2, 2000
INVENTOR(S) : Jacques-Henri Djian

It is certified that error appears in the above-identified patent and that said Letters Patent is hereby corrected as shown below:

Abstract, change: "principle" to --principal--.

Col. 1, line 21, change: "principle" to --principal--.

Col. 1, line 52, change: "principle" to --principal--.

Col. 2, line 5, change: "principle" to --principal--.

Col. 2, line 61, change: "principle" to --principal--.

Col. 3, line 5, change: "principle" to --principal--.

Col. 4, line 15, change: "principle" to --principal--.

UNITED STATES PATENT AND TRADEMARK OFFICE
CERTIFICATE OF CORRECTION

PATENT NO. : 6,058,371
DATED : May 2, 2000
INVENTOR(S) : Jacques-Henri Djian

It is certified that error appears in the above-identified patent and that said Letters Patent is hereby corrected as shown below:

Col. 6, line 59 (Claim 1), change: "principle" to –principal–.

Col. 8, line 57 (Claim 13), change: "principle" to –principal–.

Col. 9, line 38 (Claim 23), change: "principle obligation, the principle" to –principal obligation, the principal–.

Col. 10, line 1 (Claim 23), change: "principle" to –principal–.

Signed and Sealed this

Twenty-second Day of May, 2001

Attest:

NICHOLAS P. GODICI

*Attesting Officer*  Acting Director of the United States Patent and Trademark Office